United States Patent
Hsu (10) Patent No.: US 8,576,587 B2
(45) Date of Patent: Nov. 5, 2013

(54) PREDICTIVE SYNCHRONOUS RECTIFICATION CONTROLLER, SWITCHING POWER CONVERTER WITH PREDICTIVE SYNCHRONOUS RECTIFICATION CONTROLLER AND CONTROLLING METHOD THEREOF

(75) Inventor: Ta-Ching Hsu, Taipei (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 269 days.

(21) Appl. No.: 13/092,944

(22) Filed: Apr. 23, 2011

(65) Prior Publication Data

US 2012/0020123 A1   Jan. 26, 2012

(30) Foreign Application Priority Data

Jul. 20, 2010   (TW) .............................. 99123722 A (51) Int. Cl.
*H02M 3/335*   (2006.01)
(52) U.S. Cl.
USPC .................. 363/21.14; 363/21.06; 363/21.12; 363/21.16; 363/21.17; 363/21.18
(58) Field of Classification Search
USPC .......... 363/21.06, 21.12, 21.14, 21.16, 21.17, 363/21.18
See application file for complete search history.

(56) References Cited

U.S. PATENT DOCUMENTS

| | | | | |
|---|---|---|---|---|
| 4,945,292 A * | 7/1990 | Ackerson et al. | ............. | 315/387 |
| 6,490,179 B1 * | 12/2002 | Boylan et al. | ............. | 363/21.06 |
| 7,075,346 B1 * | 7/2006 | Hariman et al. | ............. | 327/116 |
| 2007/0120547 A1 * | 5/2007 | Tateishi et al. | ................ | 323/282 |
| 2009/0257250 A1 * | 10/2009 | Liu | ............................ | 363/21.06 |
| 2009/0268494 A1 * | 10/2009 | Hu | .................................. | 363/89 |
| 2010/0182807 A1 * | 7/2010 | Miyamoto et al. | ......... | 363/21.14 |
| 2010/0188871 A1 * | 7/2010 | Kim et al. | .................. | 363/21.03 |
| 2011/0032732 A1 * | 2/2011 | Hsu | ............................ | 363/21.14 |

* cited by examiner

*Primary Examiner* — Timothy J Dole
*Assistant Examiner* — Yusef Ahmed
(74) *Attorney, Agent, or Firm* — Li & Cai Intellectual Property (USA) Office (57) ABSTRACT

A predictive synchronous rectification controller for controlling at least one synchronous rectification switch is provided. The synchronous rectification controller has a ramp generator, a peak sampling unit, and an output control unit. The ramp generator receives a synchronous signal and generates a ramp signal accordingly. The peak sampling unit generates a predicted reference voltage signal by retrieving a peak voltage of the ramp signal. The output control unit compares the ramp signal with the predicted reference voltage signal to generate a synchronous rectification control signal to control a conducting state of the switch.

15 Claims, 9 Drawing Sheets

PREDICTIVE SYNCHRONOUS RECTIFICATION CONTROLLER, SWITCHING POWER CONVERTER WITH PREDICTIVE SYNCHRONOUS RECTIFICATION CONTROLLER AND CONTROLLING METHOD THEREOF

BACKGROUND OF THE INVENTION

1. Field of the Invention

The present invention relates to a synchronous rectification controller and a controlling method thereof, which is applicable to a switching power converter circuit; in particular, to a predictive synchronous rectification controller and a controlling method thereof.

2. Description of Related Art

It is a common technique in power conversion fields to take advantage of transistor switches in place of diodes for reducing power consumption.

Figure 1:
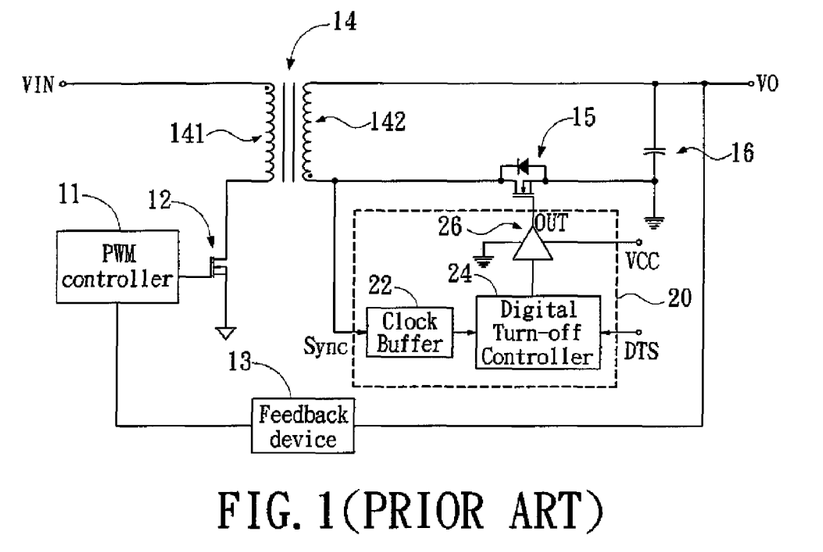
FIG. 1 shows a conventional power converting circuit with secondary-side synchronous rectification.

FIG. 1 shows a typical power converting circuit with secondary-side synchronous rectification. A primary-side of the power converting circuit has a PWM controller 11 and a main switch 12. The PWM controller 11 outputs pulse signals to control on/off state of the main switch 12 according to a feedback signal from an isolated feedback device 13. A synchronous rectification switch 15 and a secondary-side synchronous rectification controller 20 are located at the secondary-side of the power converting circuit. The synchronous rectification controller 20 controls the on/off state of the synchronous rectification switch 15 according to a signal from a secondary-side winding 142 of the transformer 14.

When the main switch 12 is turned on, a direct current (DC) input terminal VIN supplies electric power to the primary-side winding 141 of the transformer 14. Meanwhile, the synchronous rectification switch 15 is turned off. Hence, the electric power coming from the DC input terminal VIN is stored in the transformer 14. Afterwards, as the main switch 12 is turned off, the synchronous rectification controller 20 at the secondary side detects a polarity change at the secondary-side winding 142, and turns on the synchronous rectification switch 15. At this time, the transformer 14 starts releasing the stored energy to an output terminal VO and a filtering capacitor 16.

The synchronous rectification controller 20 at the secondary side has to precisely control a duty cycle of the synchronous rectification switch 15 to simulate the operation of a diode in order to reduce transforming loss and prevent the burning of the switch. The main switch 12 at the primary side and the synchronous rectification switch 15 at the secondary side have to be turned on alternately. For preventing the conducting periods of the main switch 12 and the synchronous rectification switch 15 overlap, a dead time must be preserved between the conducting period of the main switch 12 and the conducting period of the synchronous rectification switch 15. That is, both the main switch 12 and the synchronous rectification switch 15 are turned off during the dead time.

The synchronous rectification controller 20 at the secondary side in FIG. 1 adopts a complicated digital controlling method to calculate the dead time. As shown in the FIG. 1, the synchronous rectification controller 20 at the secondary side has a clock buffer 22, a digital turn-off controller 24, and an output driver 26.

Figure 2:
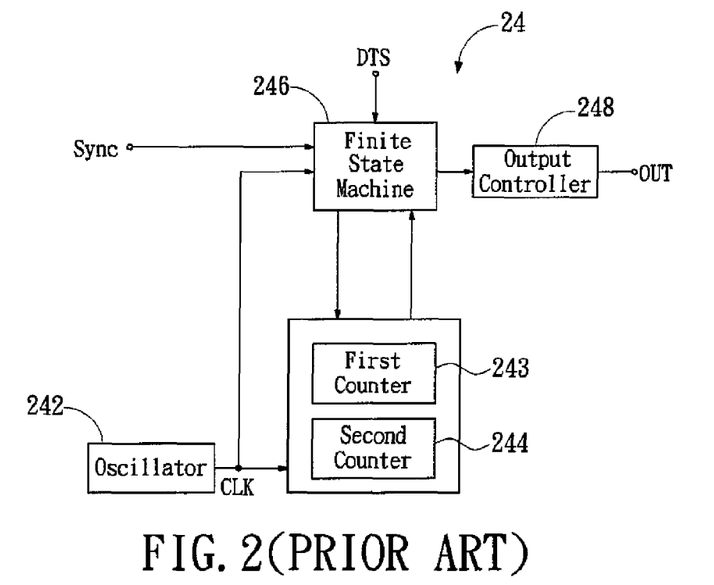
FIG. 2 is a block diagram showing a digital turn-off controller of the conventional power converting circuit of FIG. 1.

FIG. 2 is a block diagram of the digital turn-off controller 24 in FIG. 1. As shown in FIG. 2, the digital turn-off controller 24 has an oscillator 242, a first counter 243, a second counter 244, a finite state machine 246 and an output control unit 248.

The first counter 243 and the second counter 244 are both the up/down counters. The oscillator 242 generates an internal counting clock signal CLK for the counting of the first counter 243 and the second counter 244. The finite state machine 246 receives an external synchronous signal Sync and controls counting durations for the first counter 243 and the second counter 244. The external synchronous signal Sync is an output signal of the secondary-side winding 142 of the transformer 14.

Figure 3:
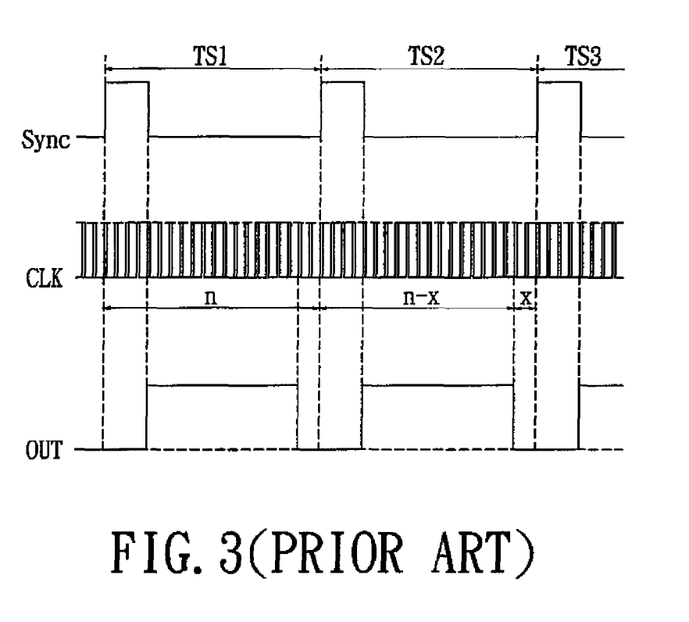
FIG. 3 is a diagram showing the waveforms of the control signals of the digital turn-off controller of the conventional power converting circuit.

FIG. 3 is a waveform diagram showing the waveforms of control signals of the digital turn-off controller 24. Please refer to FIG. 2 and FIG. 3 at the same time, when the finite state machine 246 detects a rising edge of the first switching period TS1 of the external synchronous signal Sync, a control signal is sent to the first counter 243 to start an upward counting until the finite state machine 246 detects a rising edge of the second switch period TS2 of the external synchronous signal Sync. Thereafter, the finite state machine 246 controls the first counter 243 to start a downward counting until the finite state machine 246 detects a rising edge of the third switching period TS3. Assuming the first counter 243 counts upwardly to n in the first switching period TS1, when the first counter 243 counts downwardly to n−x, the finite state machine 246 outputs an output turn-off signal to control the output control unit 248 to stop outputting a conducting signal (Namely, a driving signal OUT of a "high" voltage level). The value of x is a predetermined counting number for the dead time, and is configurable by the dead time setting terminal DTS.

Besides, when the finite state machine 246 detects the rising edge of the second switching period TS2 of the external synchronous signal Sync, the finite state machine 246 controls the second counter 243 to start the upward counting until the finite state machine 246 detects the rising edge of the third switching period TS3 of the external synchronous signal Sync. The second counter 243 is operating in a manner similar to that of the first counter 243. In the third switching period TS3, according to the counting number of the second counter 243, the finite state machine 246 outputs a turn-off signal to stop the output control unit 248 from outputting a conducting signal.

The secondary-side synchronous controller 20 utilizes the upward counting and downward counting of the counter 243 and the counter 244 to predict the conducting period of the synchronous rectification switch at the next switching period effectively and maintain a constant dead time. However, the circuit design of the secondary-side synchronous controller 20 is very complicated and its fabricating cost could not be easily reduced.

SUMMARY OF THE INVENTION

The object of the present invention is to provide a solution for simplifying the complicate circuit of the conventional predictive secondary-side synchronous rectification controller.

The still object of the present invention is to provide an analog secondary-side rectification controller, such that the dead time can be precisely controlled to maintain a high power converting efficiency and prevent the switch from burning down.

In order to achieve the aforementioned objects, according to an embodiment of the present invention, a predictive synchronous rectification controller, for controlling at least one switch, is disclosed. The predictive synchronous rectification controller comprises a ramp generator, a peak sampling unit, and an output control unit. The ramp generator is for receiving a synchronous signal and generating a ramp signal according to the synchronous signal. The peak sampling unit is for retrieving a peak voltage of the ramp signal and generating a reference voltage signal according to the peak voltage. The output control unit is for comparing the ramp signal and the reference voltage signal so as to generate a synchronous rectification control signal to control the conducting state of the switch.

Another one of the embodiments in the present invention further provides a power converting circuit with predictive synchronous rectification. The power converting circuit comprises a transformer, a synchronous rectification switch and a predictive secondary-side synchronous rectification controller. The transformer comprises a primary side winding and a secondary-side winding. The synchronous rectification switch is coupled to the secondary-side winding. The predictive secondary-side synchronous rectification controller is for controlling the synchronous rectification switch. The secondary-side synchronous rectification controller comprises a ramp generator, a peak sampling unit, an output control unit. The ramp generator is for receiving a synchronous signal and generating a ramp signal, the peak sampling unit is for retrieving a peak voltage for the ramp signal and generating a reference voltage signal according to the peak voltage, and the output control unit is for comparing the ramp signal and the reference voltage signal so as to generate a synchronous rectification control signal to control the conducting state of the switch.

According to another one of the embodiments in the present invention, a predictive synchronous rectification controlling method, for controlling at least one synchronous rectification switch of a switching power converting circuit is provided. The method comprises the steps of (a) generating a ramp signal according to a synchronous signal, wherein, the synchronous signal and the ramp signal have the same period (b) according to a peak voltage of the ramp signal, generating a predicted reference voltage signal having a gradually-declined voltage at a next period of the ramp signal, and (c) comparing the predicted reference voltage signal with the ramp signal at the next period to generate a synchronous rectification control signal to control a conducting state for the synchronous rectification switch.

In order to further understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

The present invention relates to a predictive synchronous rectification controller and a control method. The controller circuit and the control method can be applied to control flyback, forward, half-bridge or full-bridge topologies in CCM (Current Continuous Mode). Additionally, the predictive synchronous rectification controller readily adopts a simple analog circuit to control a conducting state of the synchronous rectification switch, and is suitable for secondary-side synchronous rectification control of the fixed-frequency switching power supplies.

The predictive-type synchronous rectification controller disclosed in the present invention generates a ramp signal according to the synchronous signal at a secondary side, and retrieves a peak value of the ramp signal so as to generate a corresponding reference voltage signal. And the reference voltage signal and the ramp signal at the next period are compared so as to generate a dead time control signal to turn off the synchronous rectification switch.

Figure 4:
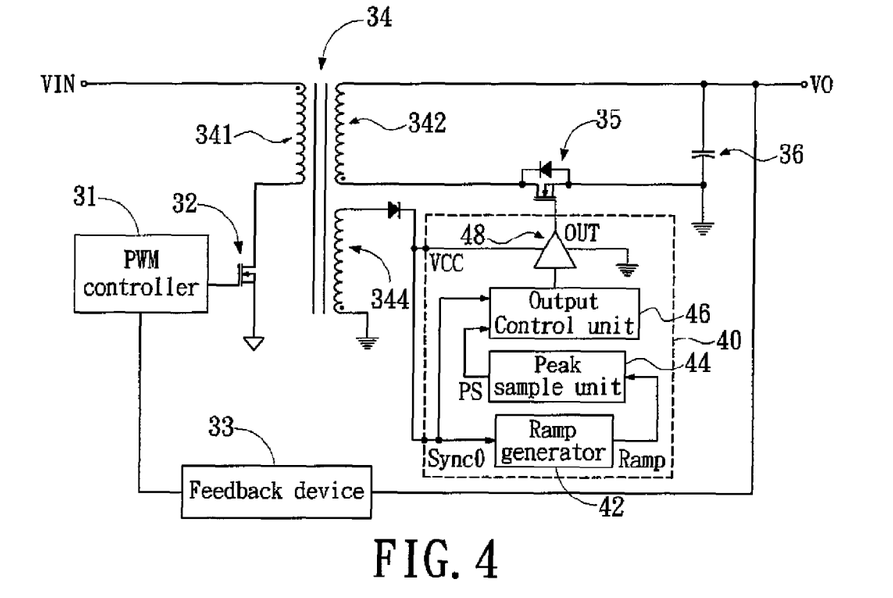
FIG. 4 shows a circuit diagram of the synchronous rectification power converting circuit according to a first embodiment of the present invention.

FIG. 4 shows a circuit diagram of the first embodiment of the synchronous rectification power converting circuit in the present invention, and a fly-back power converting circuit is described as an example. As shown in FIG. 4, the power converting circuit has a PWM controller 31 and a main switch 32 at a primary side thereof. The PWM controller 31 outputs a pulse signal to control a conducting state of the main switch 32 according to a feedback signal from an isolated feedback device 33. The power converting circuit has a synchronous rectification switch 35 and a secondary-side synchronous rectification controller 40 at a secondary side thereof. The secondary-side synchronous rectification controller 40 controls a conducting state of the synchronous rectification switch 32 according to a synchronous signal Sync0 corresponding to a pulse signal at the primary side. In the present embodiment, the secondary-side synchronous rectification controller 40 controls the conducting state of the synchronous rectification switch 35 according to a synchronous signal Sync0 coming from a secondary-side auxiliary winding 344 of the transformer 34. It is worth noting that the swing between a positive voltage level and a negative voltage level of the synchronous signal Sync0 is opposite to that of the pulse signal at the primary side.

When the pulse signal controls the main switch 32 to be turned on, a direct current (DC) input terminal VIN provides electric power to a primary side winding 341 of the transformer 34. Meanwhile, the secondary-side synchronous rectification controller 40 controls the synchronous rectification switch 35 to be turned off. Hence, the electric power coming from the DC input terminal VIN will be stored in the transformer 34. Thereafter, when the main switch 32 is turned off, the swing of the voltage levels of the synchronous signal Sync0 is varied. As the secondary-side synchronous rectification controller 40 detects the variation of the voltage level of the synchronous signal Sync0, the secondary-side synchronous rectification controller 40 turns on the synchronous rectification switch 35. As such, the transformer 34 may start to release stored energy to an output terminal VO and a filtering capacitor 36.

Figure 6:
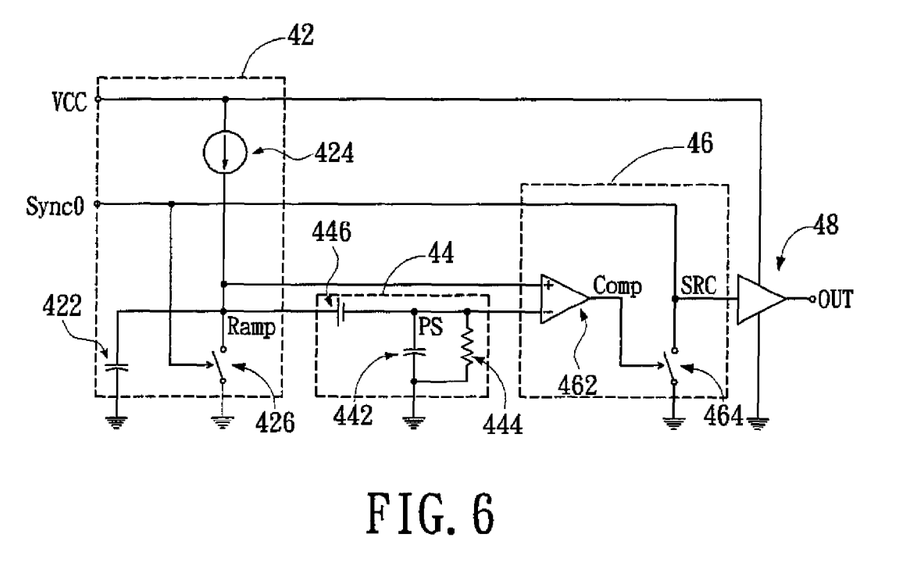
FIG. 6 shows a circuit diagram of a first embodiment of the secondary-side synchronous rectification controller of FIG. 4.

FIG. 6 is a circuit diagram of the first embodiment of the secondary-side synchronous rectification controller 40 disclosed in FIG. 4. As shown in FIG. 6, the secondary-side synchronous rectification controller 40 comprises a ramp generator 42, a peak sampling unit 44, an output control unit 46 and an output driving unit 48. The ramp generator 42 receives the synchronous signal Sync0 so as to output a ramp signal Ramp. The peak sampling unit 44 is configured to retrieve a peak voltage of the ramp signal Ramp so as to generate a predicted reference voltage signal PS. The output control unit 46 compares the ramp signal Ramp with the predicted reference voltage signal PS so as to generate a synchronous rectification control signal SRC. And based upon the synchronous rectification control signal SRC, the output drive unit 48 generates a driving signal OUT to control the conducting state for the synchronous rectification switch 35.

The ramp generator 42 further comprises a ramp generating capacitor 422, a charging source 424 and a reset switch 426. The charging source 424 is used for charging the ramp generating capacitor 422 so as to generate the ramp signal Ramp. A rising slope for the ramp signal Ramp is decided by capacitance of the ramp generating capacitor 422. The reset switch 426 is for discharging electrical charges stored in the capacitor 422. And the state of the reset switch 426 is controlled by the synchronous signal Sync0. In one embodiment, the charging source 424 is a constant current source, but the present invention is not so restricted and the charging source 424 could be a constant voltage source.

The peak sampling unit 44 comprises a holding capacitor 442, a discharging device 444 and a reference bias voltage source 446. The holding capacitor 442 is for storing the ramp signal Ramp from the ramp generator 42. The discharging device 444 is for discharging electrical charges stored in the holding capacitor 442. The output signal at the high voltage side of the holding capacitor 442 is the predicted reference voltage signal PS. The reference bias voltage source 446 is located on the circuit between the holding capacitor 442 and the ramp generator 42. The reference bias voltage source 446 is for lowering the voltage level of the ramp signal Ramp to ensure that a maximum voltage stored in the holding capacitor 442 is smaller than the peak voltage of the ramp signal Ramp. The discharging device 444 in the present embodiment is a discharging impedance device. However, the discharging device 444 may also be a constant current source or other equivalent impedance devices.

The output control unit 46 comprises a comparator 462 and a turn-off switch 464. The comparator 462 is for comparing the voltage level of the ramp signal Ramp with the voltage level of the predicted reference voltage signal PS so as to generate a dead time control signal Comp to turn on the turn-off switch 464. Duration of the dead time control signal Comp is referred to as a dead time. When the turn-off switch 464 is turned on, the high voltage level of the synchronous signal Sync0 may be pulled down, and the synchronous rectification control signal SRC is generated and outputted to the driving unit 48 so as to control the conducting state of the synchronous rectification switch 35.

Also, the secondary-side synchronous rectification controller in the present embodiment further has a power input terminal VCC. The external power supply supplies the electric power to the ramp generator 42 and the output driving unit 48 via the power input terminal VCC. Please also refer to FIG. 4, in the present embodiment, the power input terminal VCC is connected to the secondary-side auxiliary winding 344. It is worth noting that the voltage input terminal VCC may be connect to other DC electrical sources.

Figure 7:
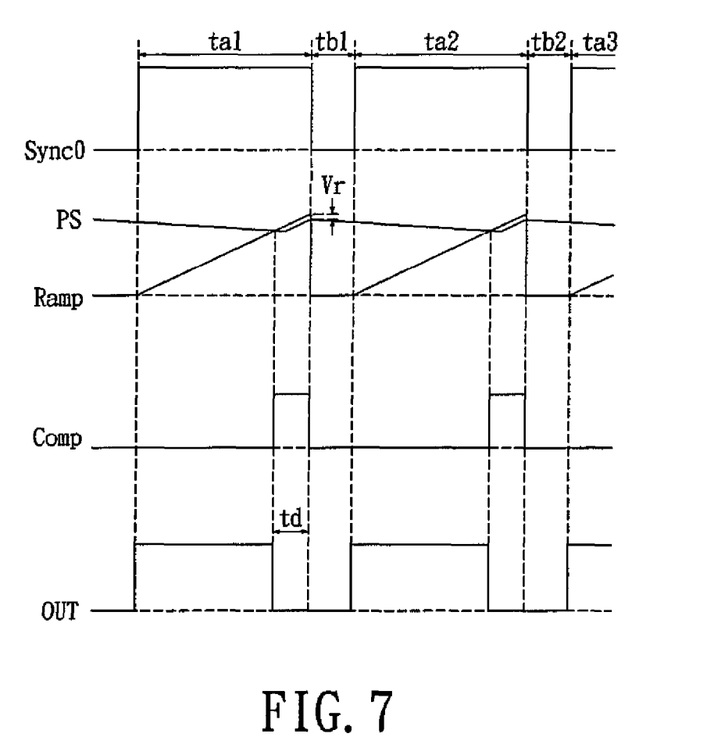
FIG. 7 is a diagram showing the waveforms of the control signals of the synchronous rectification controller in FIG. 6.

FIG. 7 is a diagram showing the waveforms of the control signals of the synchronous rectification controller in FIG. 6. As shown in FIG. 7, in a first secondary-side conducting period ta1, the synchronous signal Sync0 stays at a high voltage level to turn off the reset switch 426. At this time, the charging source 424 charges the ramp generating capacitor 422 to gradually raise a voltage level at the high-voltage side of the ramp generating capacitor 422 (i.e., the voltage level of the ramp signal Ramp). Then, in the first primary-side conducting period tb1, the synchronous signal Sync0 is shifted to a lower voltage level. At this time, the reset switch 426 is turned on to discharge the ramp generating capacitor 422 rapidly. Afterwards, in the second secondary-side conducting period ta2, the synchronous signal Sync0 is back to the high voltage level again to turn off the reset switch 426 and the ramp generating capacitor 422 is recharged.

The voltage of the ramp signal Ramp is held by the holding capacitor 442 via the reference bias voltage source 446. The reference bias voltage source 446 provides a bias voltage Vr for ensuring the maximum voltage stored in the holding capacitor 442 is smaller than the peak voltage of the ramp signal Ramp. In the first primary-side conducting period tb1, the voltage level of the ramp signal Ramp rapidly decreases. However, since the electric charges stored in the holding capacitor 442 are slowly discharged via a high-impedance discharging device 444, the voltage level of the predicted reference voltage signal PS, which is outputted from the high-voltage side of the holding capacitor 442, may gradually decrease as opposed to the rapidly decreasing in the voltage level of the ramp signal Ramp.

In the second secondary-side conducting period ta2, the voltage level of the ramp signal Ramp may increase again. However, the voltage level of the predicted reference voltage signal PS still declines. When the increasing voltage level of the ramp signal Ramp becomes larger than the voltage level of the predicted reference voltage signal PS, the comparator 462 generates a dead time control signal Comp. The dead time control signal Comp is for adjusting the synchronous signal Sync0 to modify the time duration of the second secondary-side conducting period ta2 so as to generate the synchronous rectification control signal SRC.

The high level dead time control signal Comp may last until the beginning of the second primary-side conducting period ta2. As shown in the figure, the synchronous rectification control signal SRC may rise simultaneously with the synchronous signal Sync0. However, the falling of the voltage level of the synchronous rectification control signal SRC is determined by the dead time control signal Comp.

The dead time control signal Comp defines the dead time td for the secondary-side conducting periods ta1, ta2, and ta3. As shown in the figure, the corresponding dead time for the second conducting period (including the second primary-side conducting period tb2 and the second secondary-side conducting period ta2) is determined by a comparison of the predicted reference voltage signal PS corresponding to the second conducting period and the ramp signal Ramp corresponding to the second secondary-side conducting period ta2. The maximum voltage level of the predicted reference voltage signal PS in the second conducting period is determined by the peak voltage of the ramp signal Ramp corresponding to the first secondary-side conducting period ta1.

In each of the conducting periods, the voltage level of the ramp signal Ramp may be associated with a fixed rising slope and the voltage level of the predicted reference voltage signal PS may be associated with a fixed falling slope. Hence, for each of the conducting periods, the duration of the high voltage level synchronous rectification control signal SRC is determined by the peak voltage of the ramp signal Ramp at the previous conducting period. In other words, the duration of the high voltage level synchronous rectification control signal SRC is determined by the duration of the previous secondary-side conducting period.

The rising slope of the ramp signal Ramp may be adjusted by the capacitances of the ramp generating capacitor 422. The falling slope of the predicted reference voltage signal PS may be adjusted by the discharging device 444 and the holding capacitor 442. The period of the dead time, meanwhile, may be adjusted by changing the rising slope of the ramp signal Ramp and the falling slope of the predicted reference voltage signal PS. The greater capacitance of the ramp generating capacitor 422, the higher impedance of the discharging device 444, or the greater capacitance of the holding capacitor 442 may result in a shorter dead time.

Figure 5:
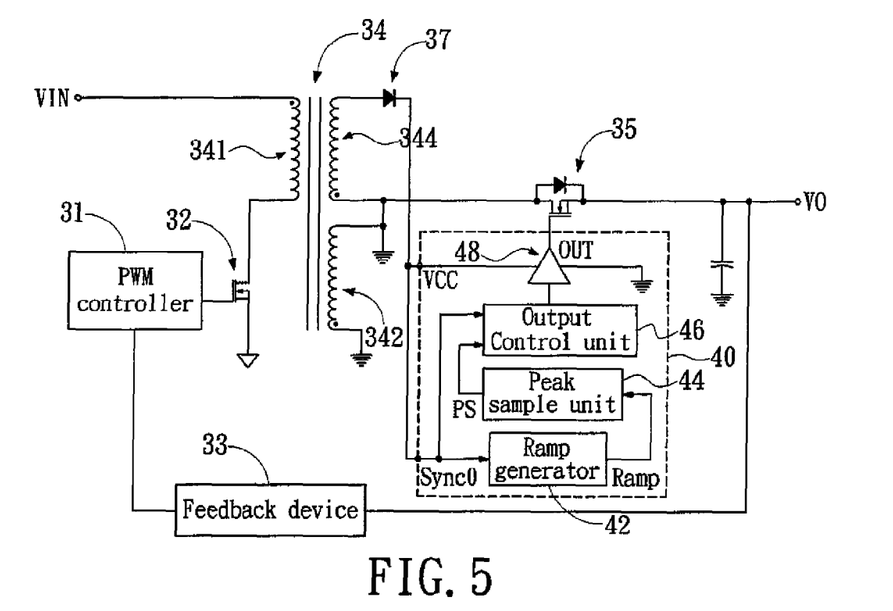
FIG. 5 shows a circuit diagram of the synchronous rectification power converting circuit according to a second embodiment of the present invention.

FIG. 5 is a circuit diagram of the second embodiment of the synchronous rectification fly-back power converting circuit disclosed in the present invention. Compared with the embodiment disclosed in FIG. 4 where the synchronous rectification switch 35 is disposed on the circuit between the secondary-side winding 342 and a ground, the synchronous rectification switch 35 disclosed in the embodiment shown in FIG. 5 is disposed on the circuit between the secondary-side winding 342 and the output terminal VO. Additionally, compared with the secondary-side synchronous rectification controller 40 shown in FIG. 4 which is coupled to the auxiliary winding 344 in order to access the desired electric power, the secondary-side synchronous rectification controller 40 illustrated in FIG. 5 is coupled to the secondary-side winding 342, and the auxiliary winding 344 is coupled to the output terminal of the secondary-side winding 342 in serial. Even these two topologies may differ in the circuit connection, the secondary-side synchronous rectification controller 40 in FIG. 5 operates in a similar manner as that shown in the FIG. 4.

Figure 8:
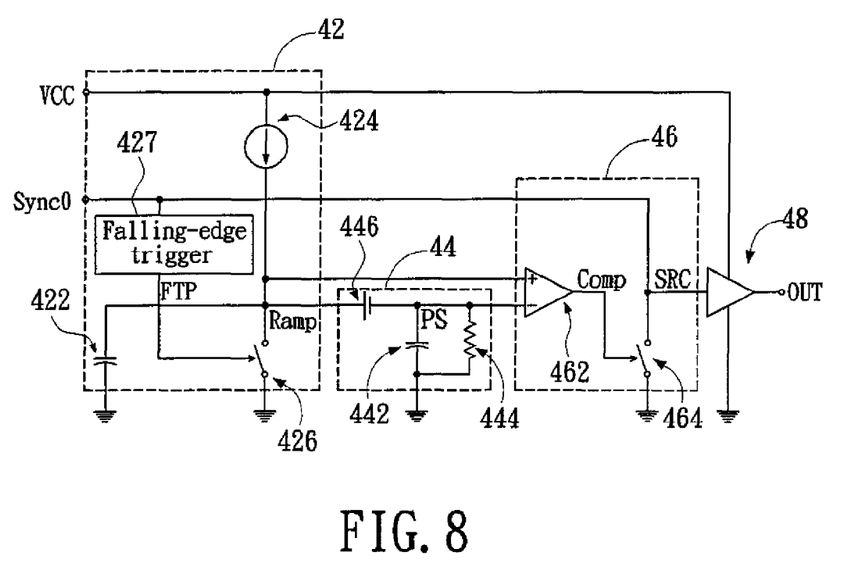
FIG. 8 shows a circuit diagram for a second embodiment of the secondary-side synchronous rectification controller disclosed in the present invention.
Figure 9:
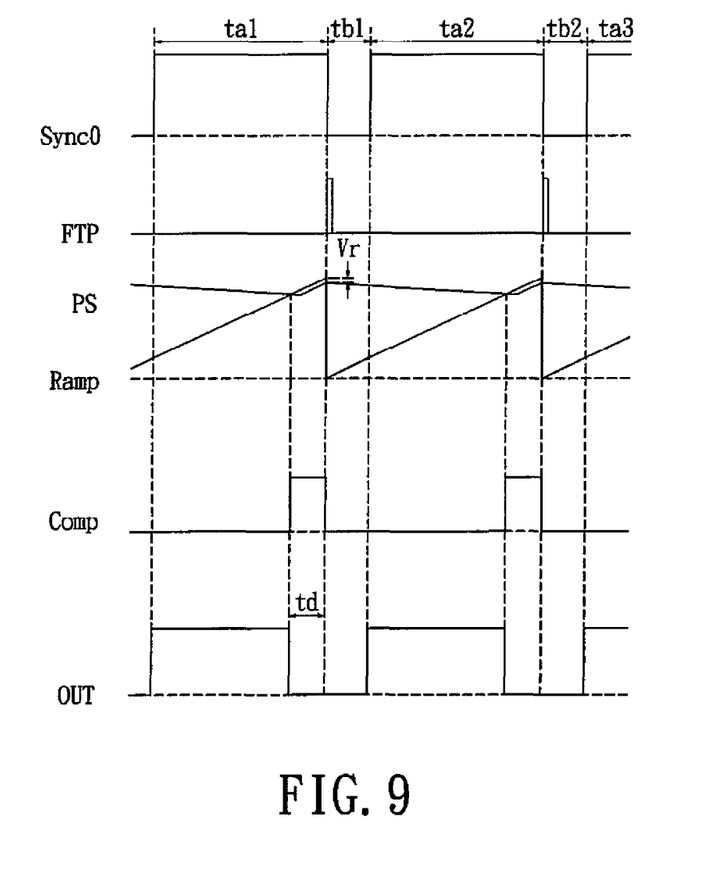
FIG. 9 is a diagram showing the waveforms of the control signals of the secondary-side synchronous rectification controller in FIG. 8 according to a preferred embodiment in the present invention.

FIG. 8 is a circuit diagram of a second embodiment of the secondary-side synchronous rectification controller disclosed in the present invention. And FIG. 9 is a diagram showing the waveforms of the corresponding control signals of the embodiment shown in FIG. 8. Compared with the embodiment disclosed in FIG. 6, the ramp generator 42 disclosed in the present embodiment further comprises a falling-edge trigger unit 427. And the falling-edge trigger unit 427 is configured to be triggered by a falling edge of the synchronous signal Sync0 so as to generate a falling edge trigger pulse FTP to turn on the reset switch 426 and discharge the ramp generating capacitor 422. Besides, the ramp generator 42 disclosed in FIG. 6 utilizes the synchronous signal Sync0 to periodically turn on the reset switch 426 and generates the non-discontinuous ramp signal Ramp. On the other hand, the present embodiment utilizes the falling edge trigger pulse FTP to turn on the reset switch 426, which significantly reduces the conducting time of the reset switch 426 so as to generate a substantially continuous ramp signal Ramp. It is worth noting that the other components for the secondary-side synchronous rectification controller in the present embodiment operate in a similar manner as the embodiment disclosed in FIG. 6.

Figure 10:
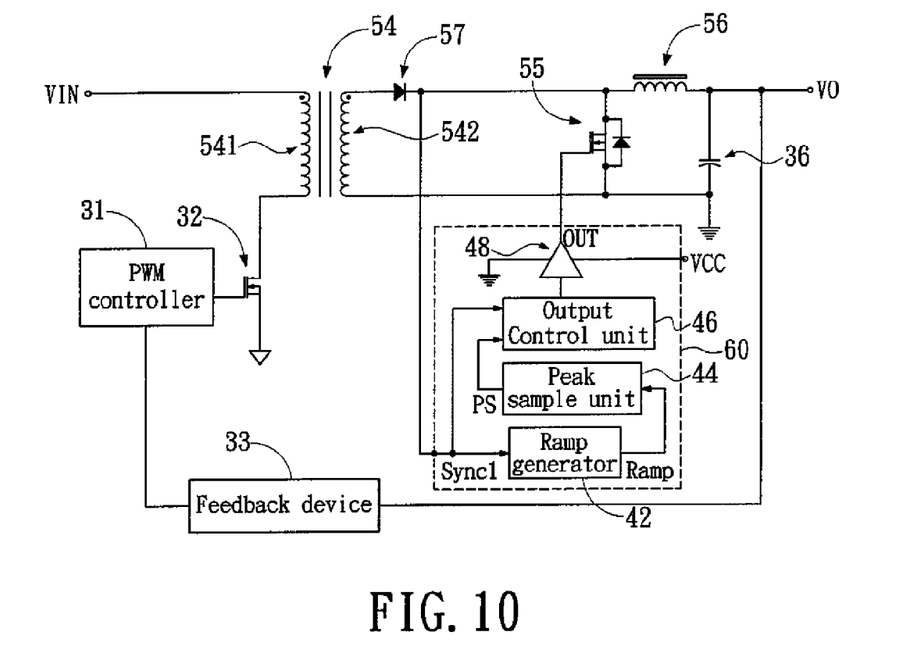
FIG. 10 shows a circuit diagram of a third embodiment of the synchronous rectification controller disclosed in the present invention.

FIG. 10 is a circuit diagram of a third embodiment of the secondary-side synchronous rectification controller disclosed in the present invention. The present embodiment relates to a forward power converting circuit. The difference between the present embodiment and the fly-back power converter in the first embodiment of the present invention is that the polarity of the secondary-side winding 542 disclosed in the present embodiment differs from the polarity of the secondary-side winding 342 disclosed in the first embodiment, and the location of the synchronous rectification switch 55 in the present embodiment differs from that of the synchronous rectification switch 35 in the first embodiment. The synchronous rectification switch 55 and the secondary-side winding 542 may form a loop and an inductor 56 is disposed on the circuit between the synchronous rectification switch 55 and the filtering capacitor 36. In addition, in the present embodiment, the auxiliary winding 344 disclosed in the first embodiment is skipped.

Also, in the present embodiment, the secondary-side synchronous rectification controller 60 is coupled to a front end of the secondary-side rectification diode 57 so as to retrieve the synchronous signal Sync1. Compared with the embodiments in FIG. 4 and FIG. 5, where the swing of the voltage levels of the synchronous signal Sync1 is opposite to that of the primary-side pulse signal, in the present embodiment, the swing of the voltage level of the synchronous signal Sync1 and that of the primary side pulse signal are consistent (i.e., in the primary side conduction period, the synchronous signal Sync1 is in the high voltage level, instead of the low voltage level).

Figure 11:
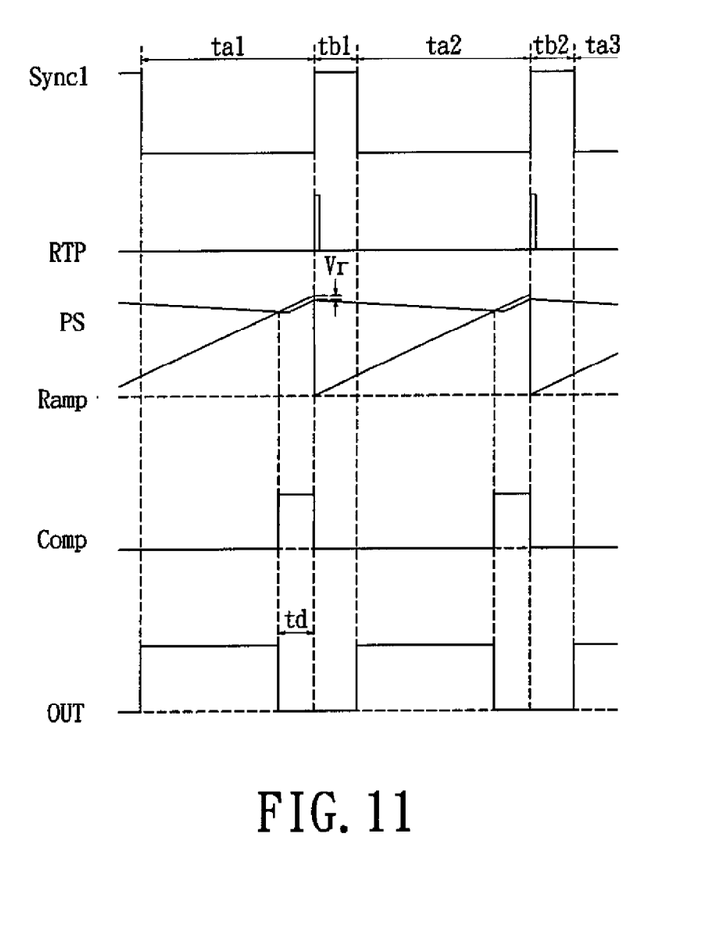
FIG. 11 is a diagram showing the waveforms of the control signals of the secondary-side synchronous rectification controller in FIG. 10 according to a preferred embodiment in the present invention.

FIG. 11 is a diagram showing the waveforms of the control signals of the secondary-side synchronous rectification controller shown in FIG. 10 that converts the synchronous signal Sync1 into the dead time control signal Comp to control the conducting state of the synchronous rectification switch 55. The embodiment shown in FIG. 9 utilizes the falling edge trigger pulse to control the conduction of the reset switch 426 so as to form the ramp signal Ramp. In the present embodiment, since the swing of the voltage levels of the synchronous signal Sync1 and that of the PWM signal at the primary side are consistent, a rising edge triggering pulse RTP is generated to control the conducting state of the reset switch so as to form the ramp signal Ramp. The generation of the dead time control signal Comp and the synchronous rectification control signal SRC in the present embodiment are similar to that associated with the embodiments disclosed in FIG. 6 and FIG. 9, and thus the redundant information is not repeated.

In the present invention, the conducting periods are defined by the synchronous signals Sync0 and Sync1 so as to generate the ramp signal Ramp. Furthermore, by retrieving the peak voltage of the ramp signal Ramp and setting up a reference bias voltage Vr, the dead time control signal Comp is generated. Hence, the present invention provides an alternative for the conventional complicated digital control circuit. Also, because the peak voltage retrieved by the peak sampling unit varies attending with the duty cycle, the secondary-side synchronous rectification controller in the present invention is able to adjust length of the dead time by using the ramp generating capacitor 422 and the holding capacitor 442.

To sum up, the secondary-side synchronous rectification controller in the present invention adopts a predictive control method, which retrieves the ramp signal at the previous period to determine the dead time. Thus, it is able to achieve high efficiency power control under the conditions of high deviation in operating frequency and high voltage variation in power source.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A secondary-side synchronous rectification controller for controlling at least one synchronous rectification switch, comprising:
   a ramp generator, for receiving a synchronous signal and generating a ramp signal according to the synchronous signal;
   a peak sampling unit, for retrieving a peak voltage of the ramp signal and generating a predicted reference voltage signal, which gradually declines in voltage level, and the peak sampling unit comprising:
      a maintaining capacitor, for receiving the ramp signal, and outputting the predicted reference voltage signal from a high-voltage side thereof;
      a discharging unit for discharging electrical charges stored in the maintaining capacitor; and
      a reference bias voltage source, for lowering a stored voltage of the maintaining capacitor so as to have a maximum stored voltage smaller than the peak voltage of the ramp signal; and
   an output control unit, for comparing the ramp signal with the predicted reference voltage signal and generating a dead time control signal to control a conducting state of the synchronous rectification switch.

2. The secondary-side synchronous rectification controller as claimed in claim 1, wherein when a voltage level of the ramp signal is higher than a voltage level of the predicted reference voltage signal, the output control unit turns off the synchronous rectification switch.

3. The secondary-side synchronous rectification controller as claimed in claim 1, wherein the ramp generator comprises:
   a ramp generating capacitor;
   a charging source, for charging the ramp generating capacitor so as to generate the ramp signal; and
   a reset switch, controlled by the synchronous signal, for discharging electrical charges stored in the ramp generating capacitor.

4. The secondary-side synchronous rectification controller as claimed in claim 3, wherein, the charging source is a constant current source or a constant voltage source.

5. The secondary-side synchronous rectification controller as claimed in claim 1, wherein, the discharging unit is a discharging impedance device or a constant current source.

6. The secondary-side synchronous rectification controller as claimed in claim 1, further comprising a voltage input terminal coupled to an auxiliary winding at a secondary side, for providing electric power to the ramp generator.

7. The secondary-side synchronous rectification controller as claimed in claim 1, wherein the synchronous signal is an output signal from a secondary side winding.

8. The secondary-side synchronous rectification controller as claimed in claim 1, wherein the output control unit generates a synchronous rectification control signal to control the conducting state of the synchronous rectification switch according to the dead time control signal and the synchronous signal.

9. A power converting circuit with secondary-side synchronous rectification, comprising:
   a transformer, having a primary-side winding and a secondary-side winding;
   a synchronous rectification switch, coupled to the secondary-side winding; and
   a secondary-side synchronous rectification controller, for controlling the synchronous rectification switch, and the synchronous rectification switch comprising:
      a ramp generator, for receiving a synchronous signal and generating a ramp signal according to the synchronous signal;
      a peak sampling unit, for retrieving a peak voltage of the ramp signal and generating a predicted reference voltage signal, which gradually declines in voltage level, and the peak sampling unit comprising:
         a maintaining capacitor, for receiving the ramp signal, and outputting the predicted reference voltage signal from a high-voltage side thereof;
         a discharging unit for discharging electrical charges stored in the maintaining capacitor; and
         a reference bias voltage source, for lowering a stored voltage of the maintaining capacitor so as to have a maximum stored voltage smaller than the peak voltage of the ramp signal; and
      an output control unit, for comparing the ramp signal and the predicted reference voltage signal and generating a dead time control signal to control a conducting state of the synchronous rectification switch.

10. The power converting circuit as claimed in claim 9, wherein, when a voltage level of the ramp signal is higher than a voltage level of the predicted reference voltage signal, the output control unit turns off the synchronous rectification switch.

11. The power converting circuit as claimed in claim 9, wherein, the ramp generator comprises:
   a ramp generating capacitor;
   a charging source, for charging the ramp generating capacitor so as to generate the ramp signal; and
   a reset switch, controlled by the synchronous signal, for discharging electrical charges stored in the ramp generating capacitor.

12. The power converting circuit as claimed in claim 11, wherein, the charging source is a constant current source or a constant voltage source.

13. The power converting circuit as claimed in claim 11, wherein, the discharging unit is a discharging impedance device or a constant current source.

14. The power converting circuit as claimed in claim 9, wherein, the secondary-side synchronous rectification controller further comprises a power input terminal coupled to a secondary-side auxiliary winding.

15. The power converting circuit as claimed in claim 9, wherein, the synchronous signal is an output signal of the secondary-side winding.

* * * * *